US008787350B2

(12) United States Patent
Joshi et al.

(10) Patent No.: US 8,787,350 B2
(45) Date of Patent: Jul. 22, 2014

(54) SYSTEM AND METHOD TO FACILITATE THE USE OF MULTIPLE RADIOS TO INCREASE THE CAPACITY OF A WIRELESS COMMUNICATION NETWORK

(75) Inventors: Avinash Joshi, Orlando, FL (US); Shyamal Ramachandran, Maitland, FL (US)

(73) Assignee: Meshnetworks, Inc., Maitland, FL (US)

( * ) Notice: Subject to any disclaimer, the term of this patent is extended or adjusted under 35 U.S.C. 154(b) by 1299 days.

(21) Appl. No.: 11/295,763

(22) Filed: Dec. 7, 2005

(65) Prior Publication Data
US 2007/0127386 A1 Jun. 7, 2007

(51) Int. Cl.
- *H04L 12/28* (2006.01)
- *H04L 12/26* (2006.01)
- *G06F 15/173* (2006.01)

(52) U.S. Cl.
USPC ............ 370/351; 370/229; 370/334; 709/238

(58) Field of Classification Search
USPC .......... 370/216, 238, 252, 338, 310; 455/428, 455/516; 701/202
See application file for complete search history.

(56) References Cited

U.S. PATENT DOCUMENTS

| | | | |
|---|---|---|---|
| 5,732,078 A * | 3/1998 | Arango | 370/355 |
| 6,167,025 A * | 12/2000 | Hsing et al. | 370/216 |
| 6,298,053 B1 * | 10/2001 | Flammer et al. | 370/349 |
| 6,363,319 B1 * | 3/2002 | Hsu | 701/202 |
| 6,807,165 B2 | 10/2004 | Belcea | |
| 6,873,839 B2 | 3/2005 | Stanforth | |

(Continued)

FOREIGN PATENT DOCUMENTS

| | | |
|---|---|---|
| JP | 2003309508 A | 10/2003 |
| JP | 2006526937 A | 11/2006 |

(Continued)

OTHER PUBLICATIONS

Korean Intellectual Property Office (KIPO) Notice of Preliminary Rejection (Translation)—mailed Dec. 30, 2009—3 pages.

(Continued)

*Primary Examiner* — Marsha D Banks Harold
*Assistant Examiner* — Christopher Wyllie
(74) *Attorney, Agent, or Firm* — Randi L. Karpinia; Brian M. Mancini; Kenneth A. Haas

(57) ABSTRACT

A system and method for increasing the capacity of a wireless network (100, 300) including a plurality of access points (APs) (106, 305) and a plurality of nodes (200), at least one of said nodes (200) and at least one of said APs (106, 305) including multiple radios (310), the method comprising: (i) determining the routing metrics to one of said APs through each radio interface that is common between one of the nodes and that AP; (ii) selecting the radio interface whose routing metrics meet a desired criteria for packet stream transmission between the at least one node and the AP; and (iii) transmitting at least one packet stream from the node to the AP through the selected radio interface.

20 Claims, 7 Drawing Sheets

(56) References Cited

U.S. PATENT DOCUMENTS

| | | | |
|---|---|---|---|
| 6,928,482 B1* | 8/2005 | Ben Nun et al. | 709/235 |
| 7,020,110 B2* | 3/2006 | Walton et al. | 370/334 |
| 7,065,376 B2* | 6/2006 | Wolman et al. | 455/517 |
| 7,558,818 B2* | 7/2009 | Joshi et al. | 709/200 |
| 7,710,932 B2* | 5/2010 | Muthuswamy et al. | 370/338 |
| 7,787,382 B2* | 8/2010 | Strutt et al. | 370/238 |
| 8,068,428 B2* | 11/2011 | Strutt et al. | 370/238 |
| 8,243,603 B2* | 8/2012 | Gossain et al. | 370/237 |
| 2002/0058502 A1* | 5/2002 | Stanforth | 455/422 |
| 2002/0191573 A1* | 12/2002 | Whitehill et al. | 370/338 |
| 2003/0058886 A1* | 3/2003 | Stanforth et al. | 370/468 |
| 2003/0107998 A1* | 6/2003 | Mowery et al. | 370/252 |
| 2003/0195005 A1* | 10/2003 | Ebata | 455/445 |
| 2004/0072562 A1* | 4/2004 | Heuvel et al. | 455/428 |
| 2004/0090924 A1* | 5/2004 | Giaimo et al. | 370/252 |
| 2004/0143842 A1 | 7/2004 | Joshi | |
| 2004/0156345 A1* | 8/2004 | Steer et al. | 370/338 |
| 2004/0170179 A1* | 9/2004 | Johansson et al. | 370/395.2 |
| 2004/0185887 A1* | 9/2004 | Wolman et al. | 455/516 |
| 2004/0252643 A1* | 12/2004 | Joshi | 370/238 |
| 2005/0025102 A1* | 2/2005 | Kalish | 370/338 |
| 2005/0185632 A1* | 8/2005 | Draves et al. | 370/351 |
| 2005/0238058 A1* | 10/2005 | Peirce et al. | 370/503 |
| 2005/0282494 A1* | 12/2005 | Kossi et al. | 455/41.2 |
| 2006/0030265 A1* | 2/2006 | Desai et al. | 455/41.2 |
| 2006/0142033 A1* | 6/2006 | Wolman et al. | 455/509 |
| 2007/0070937 A1* | 3/2007 | Demirhan et al. | 370/328 |
| 2008/0096575 A1* | 4/2008 | Aragon et al. | 455/453 |
| 2008/0107091 A1* | 5/2008 | Ramachandran | 370/338 |
| 2008/0168030 A1* | 7/2008 | Songer | 707/3 |
| 2008/0170550 A1* | 7/2008 | Liu et al. | 370/338 |
| 2008/0225829 A1* | 9/2008 | Sachs et al. | 370/351 |
| 2009/0135824 A1* | 5/2009 | Liu | 370/392 |
| 2011/0213897 A1* | 9/2011 | Zhao et al. | 709/248 |

FOREIGN PATENT DOCUMENTS

| | | |
|---|---|---|
| WO | 2004064303 A2 | 7/2004 |
| WO | 2004114690 A1 | 12/2004 |
| WO | WO 2007053141 A1 * | 5/2007 |

OTHER PUBLICATIONS

Sumit Roy et al "Capacity Scaling with Multiple Radios and Multiple channels in Wireless Mesh Networks"—IEEE WiMesh, Sep. 2005—10 pages.

International Search Report for International Application No. PCT/US06/61583 mailed on Sep. 26, 2007.

Written Opinion for International Application No. PCT/US06/61583 mailed on Sep. 26, 2007.

International Preliminary Report on Patentability for International Application No. PCT/US06/61583 mailed on Jun. 11, 2008.

European Extended Search Report for European Application No. 06848437.7, European Patent Office, Munich, Germany, mailed on Oct. 10, 2010.

Office Action mailed Aug. 19, 2011, in European Patent Application No. 06848437.7-2416.

Ramachandran, et al., "On the Design and Implementation of Infrastructure Mesh Networks" Sep. 30, 2005, p. 1-8, figures 1-6 http://imj.ucsb.edu/papers/WIMESH-05.pdf.

Kyasanur, et al., "Routing in Multi-Channel Multi-Interface Ad Hoc Wireless Networks" Dec. 31, 2004, http://www.crhc.illinois.edu/wireless/papers/pradeep-routing-dec2004.pdf.

Draves, et al., "Routing in Multi-Radio, Multi-Hop Wireless Mesh Networks", Proceedings of the 10th Annual International Conference on Mobile Computing and Networking, Mobicom, Phledelphia, PA, Sep. 26-Oct. 1, 2004.

English Language Translation of Office Action mailed on Nov. 9, 2010 in Japanese Patent Application No. 2008-544624.

English Language Translation of Notice of Allowance mailed Mar. 1, 2011, in Japanese Patent Application No. 2008-544624.

English Language Translation of Office Action mailed Dec. 10, 2009, in Korean Patent Application No. 10-2008-7016463.

English language Abstract of Japanese Patent Publication No. JP 2005130193 A, European Patent Office, espacenet database—Worldwide (2005).

* cited by examiner

SYSTEM AND METHOD TO FACILITATE THE USE OF MULTIPLE RADIOS TO INCREASE THE CAPACITY OF A WIRELESS COMMUNICATION NETWORK

FIELD OF THE INVENTION

The present invention relates in general to wireless communication networks; and more particularly to a system and method for use of multiple radio interfaces in a wireless network, in order to increase the capacity of the network.

BACKGROUND

Wireless communication networks, such as mobile wireless telephone networks, have become increasingly prevalent. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communications signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at a first node to communicate simultaneously with several other nodes in its coverage area.

In recent years, a type of mobile communications network known as an "ad-hoc" network has been developed. In this type of network, each mobile node is capable of operating as a base station or router for the other mobile nodes, thus eliminating the need for a fixed infrastructure of base stations.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in United States Patent Application 2002-0058502 entitled "Ad Hoc Peer-to-Peer Mobile Radio Access System Interfaced to the PSTN and Cellular Networks", filed on Jun. 29, 2001, in U.S. Pat. No. 6,907,165 entitled "Time Division Protocol for an Ad-Hoc, Peer-to-Peer Radio Network Having Coordinating Channel Access to Shared Parallel Data Channels with Separate Reservation Channel", granted on Oct. 19, 2004, and in U.S. Pat. No. 6,873,839 entitled "Prioritized-Routing for an Ad-Hoc, Peer-to-Peer, Mobile Radio Access System", granted on Mar. 29, 2005, all assigned to the assignee of the present invention, and the entire content of each being incorporated herein by reference.

Network capacity of wireless networks is both a business and technological challenge due to the impact of increased network usage coupled with the dynamic nature of such networks. In today's conventional systems, such as single-radio wireless local area networks (WLAN), nodes typically cannot both transmit and receive at the same time. Further, traditional fundamental media access control (MAC) design of the nodes may restrict them from communicating in a full-duplex mode. These limitations in conventional nodes adversely affect the performance of multihop networks using such conventional nodes by preventing intermediate relay nodes from efficiently utilizing available resources. In particular, for example, single-radio WLAN relay nodes have to occupy an air interface twice for every packet they forward, once during the reception of the packet and again during the transmission of the packet, thereby reducing their capacity by at least half.

Several techniques exist in the art for increasing the capacity of, and overall throughput in, wireless networks. U.S. Patent Application 2004/0090924, entitled "Method and apparatus for wireless routing on a plurality of different wireless channels", filed Nov. 4, 2003, the entire content being incorporated herein by reference, for example, relates to a wireless network in which different channels are used for conveying different types of data. Moreover, United States patent application 2003/0107998 entitled "Wireless bandwidth aggregator", filed Jun. 12, 2003, the entire content being incorporated herein by reference, relates to a method for determining the total available bandwidth over different channels and a mechanism for splitting traffic over the channels. These two published patent applications, as well as any other documents referenced herein, are incorporated by reference.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
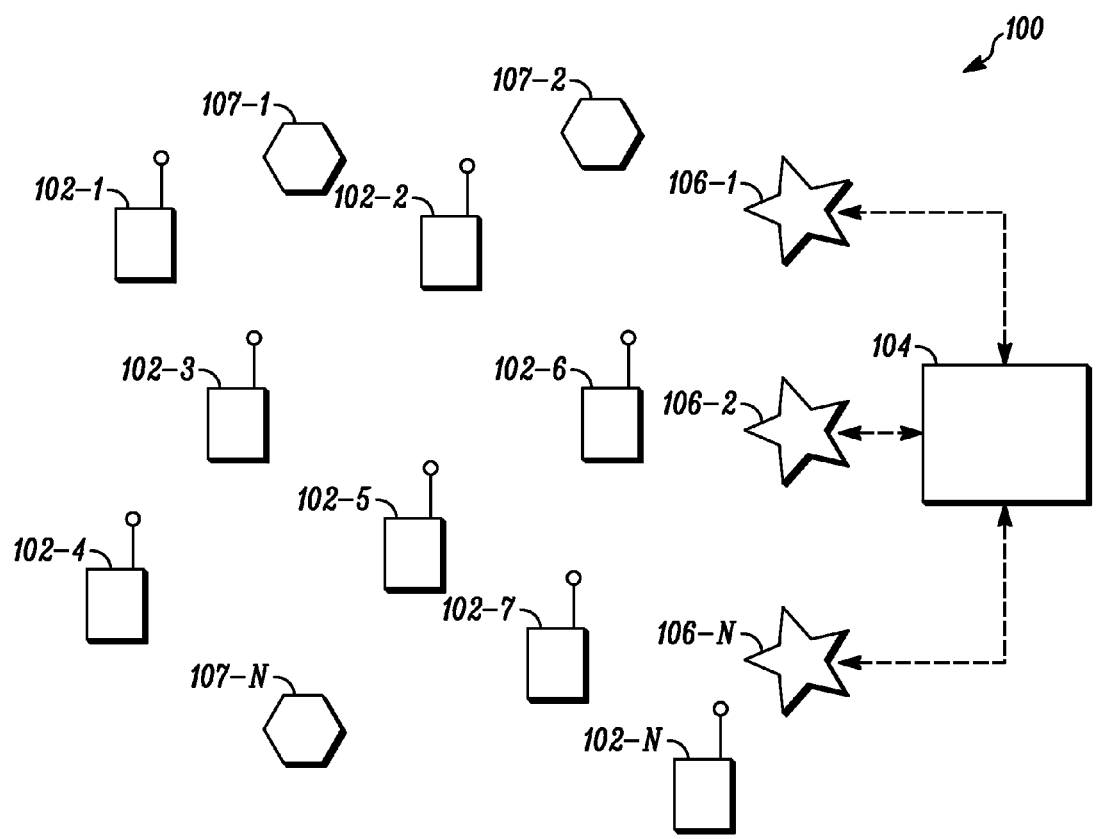
FIG. 1 is a block diagram of an example ad-hoc wireless communications network including a plurality of nodes employing a system and method in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to utilizing multiple devices to increase the capacity of a wireless communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of utilizing multiple devices to increase the capacity of a wireless communication network described herein. The non-processor circuits may include, but are not limited to, a radio receiver, a radio transmitter, signal drivers, clock circuits, power source circuits, and user input devices. As such, these functions may be interpreted as steps of a method to utilize multiple devices to increase the capacity of a wireless communication network. Alternatively, some or all functions could be implemented by a state machine that has no stored program instructions, or in one or more application specific integrated circuits (ASICs), or one or more field programmable gate arrays (FPGAs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present invention provides a system and method for increasing the capacity of a wireless network including a plurality of access points (APs) and a plurality of nodes, at least one of the nodes and at least one of the APs including multiple radios, the method comprising: (i) determining the routing metrics to at least one of the radio interfaces of one of the APs through each radio interface that is available on one of the nodes, where routing metrics also account for the number of radios which can be used to transfer data and their respective data rates and traffic loads; (ii) selecting the radio interface whose routing metrics meet a desired criteria for packet stream transmission between the at least one node and the AP; and (iii) transmitting at least one packet stream from the node to the AP through the selected radio interface.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102, mobile nodes 102, or stations below), and can, but is not required to, include a fixed network 104 having a plurality of access points 106-1, 106-2, . . . 106-n (referred to generally as nodes 106, access points 106, or IAPs), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in United States Patent Application 20020058502, U.S. Pat. No. 6,807,165 and U.S. Pat. No. 6,873,839, referenced above.

Figure 2:
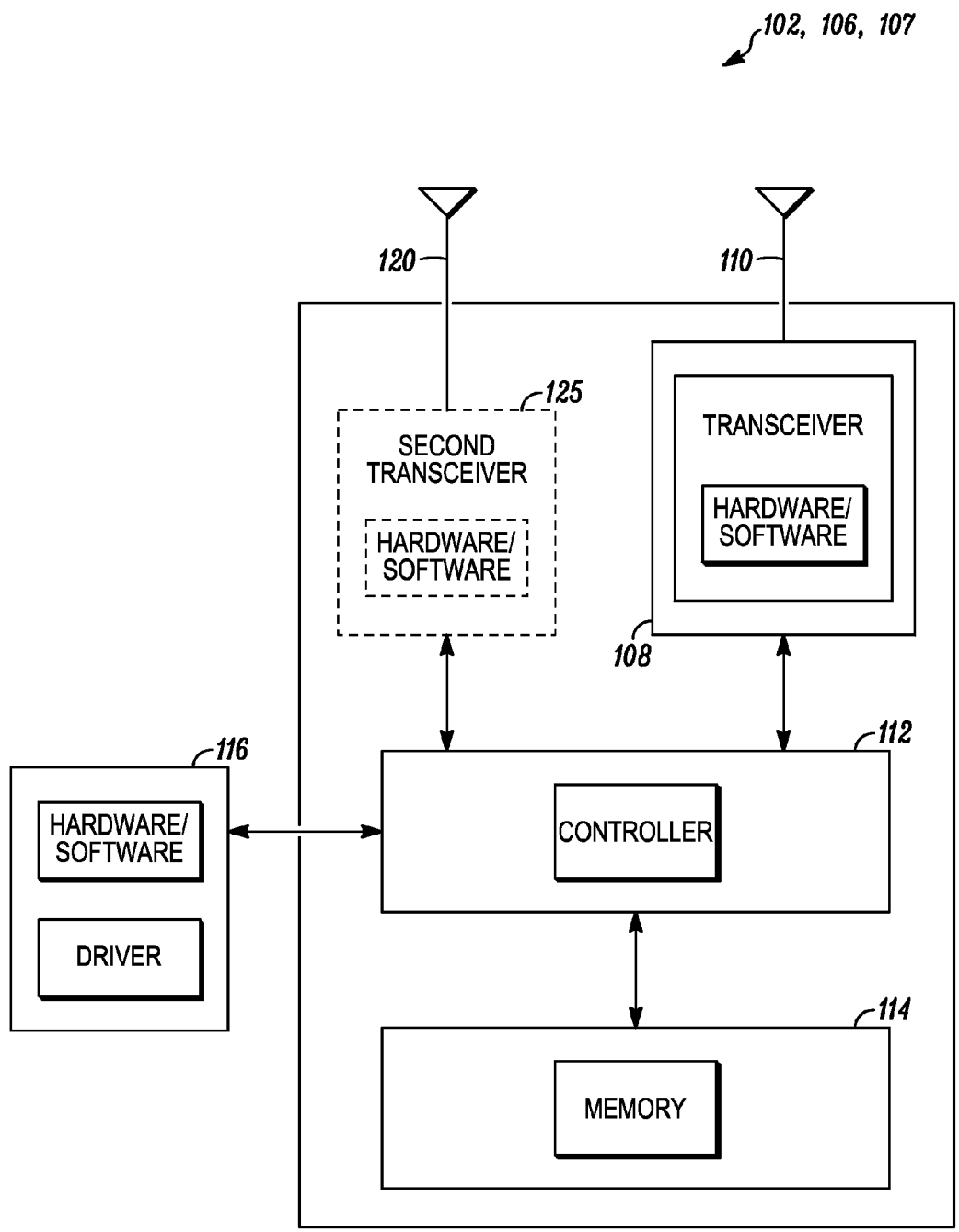
FIG. 2 is a block diagram illustrating an example of a mobile node employed in the network shown in FIG. 1.

As shown in FIG. 2, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information. It will be appreciated by those of ordinary skill in the art, that each node 102, 106, 107 can optionally included multiple transceivers and antennas such as a second transceiver 125 coupled to a second antenna 120 as illustrated in FIG. 2 and also capable of receiving and transmitting signals, such as packetized signals, to and from the node 102, 106 or 107, under the control of a controller 112.

Each node 102, 106 and 107 further includes a memory 114, which preferably comprises one or more of a random access memory (RAM), a read-only memory (ROM), an electrically erasable programmable read-only memory (EEPROM), and a flash memory, each of which is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 can also include the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

As will now be discussed, the use of multiple radio interfaces by the nodes in a wireless network offers several advantages. Effective use of multiple radio interfaces, however, requires some changes to be made to standard routing and in the way packets are handled, as discussed below. Multi-radio nodes have the ability to simultaneously receive packets on one of their radio interfaces and forward other packets on other radio interfaces. This pipelining capability can make multi-radio nodes suitable for use as efficient relays in forming meshed backbones. Moreover, an incorporation of multiple radio interfaces is suitable for use by network nodes that form convergence points or confluences of network traffic, such as, for example, Access Points (APs) or Base Stations which are often required to handle multiple traffic flows simultaneously. An AP having multiple interfaces, in this regard, would cause significantly fewer delays throughout the network than an AP having a single radio interface.

Figure 3:
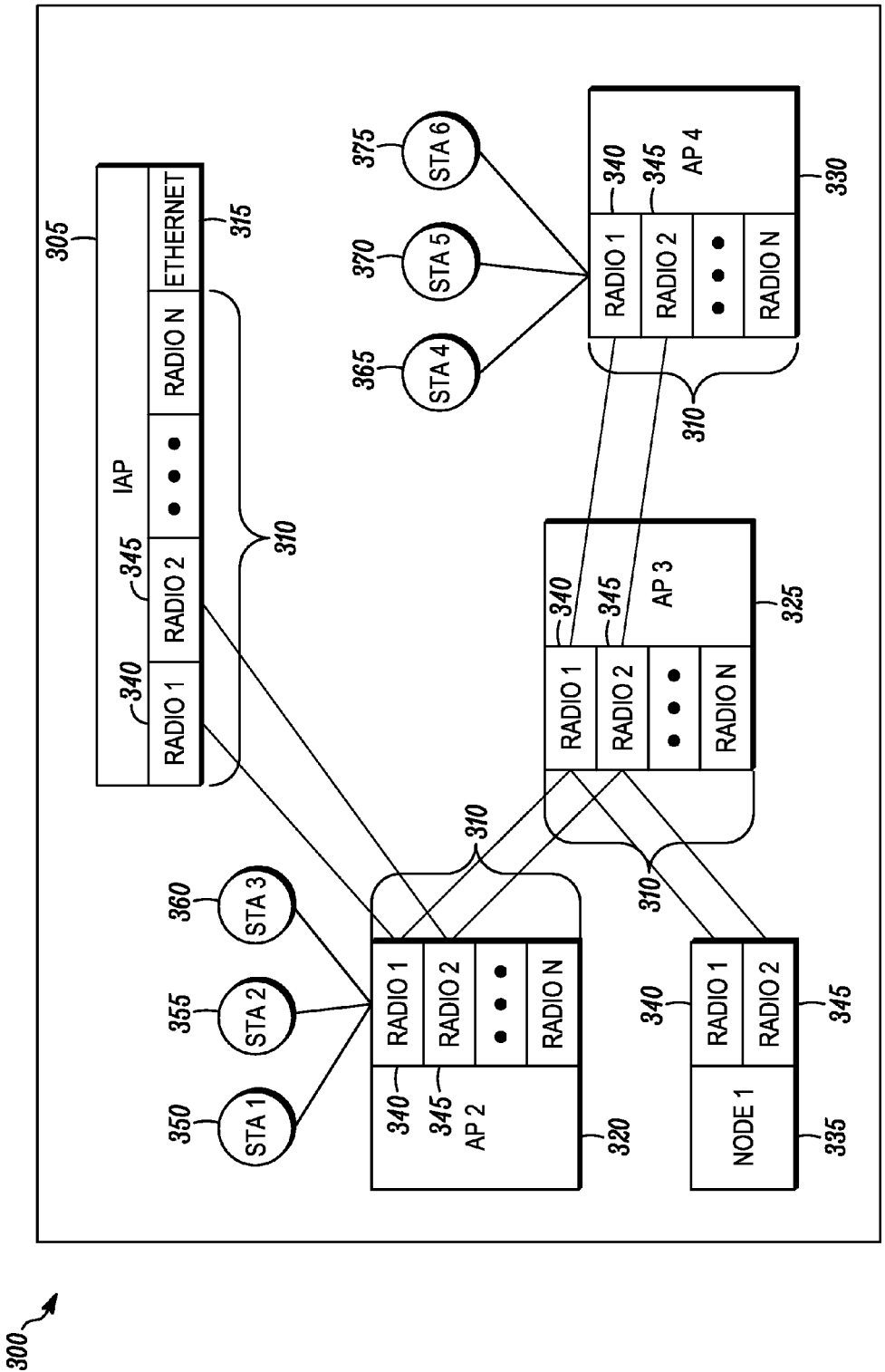
FIG. 3 is a diagram illustrating a sample network as shown in FIG. 1, in which nodes have multiple radio interfaces, in accordance with an embodiment of the present invention.

FIG. 3 illustrates a sample network 300 in which at least one node has multiple radio interfaces. In particular, an Intelligent Access Point (IAP) 305, as discussed above, is communicatively coupled to and interfaces with Radios 1 through n (hereinafter "a plurality of radios 310") and with a wired connection or Ethernet 315 within the network 300. Access Points (APs) 2, 3, and 4 (320, 325, 330 respectively) also can be communicatively coupled to and interface with the plurality of radios 310. Further, one or more nodes, such as a Node 1 (335) can be communicatively coupled to and interface with one or more of the plurality of radios 310 such as Radios 1 (340) and 2 (345). STAs 1-6 (350, 355, 360, 365, 370, and 375) are communicatively coupled to and interface with one or more of the plurality of radios 310 such as Radio 1 (340). It will be appreciated by those of ordinary skill in the art that each of the plurality of radios 310 can be capable of operating using one or more wireless communication protocols such as IEEE 802.11a, IEEE 802.11g, Bluetooth, or an equivalent.

Advantageously, using the network configuration of FIG. 3, for example, stations such as STA 1 (350) can get up to double or triple the throughput, depending on the number of radios used, compared to a single radio configuration, as discussed in more detail below.

The system and method of the present invention can utilize a routing engine that supports multiple radio interfaces, in order to facilitate the network configuration depicted in FIG. 3. Moreover, layer 2 routing can be used, so that the network can act as a bridge to upper layer protocols.

Figure 4:
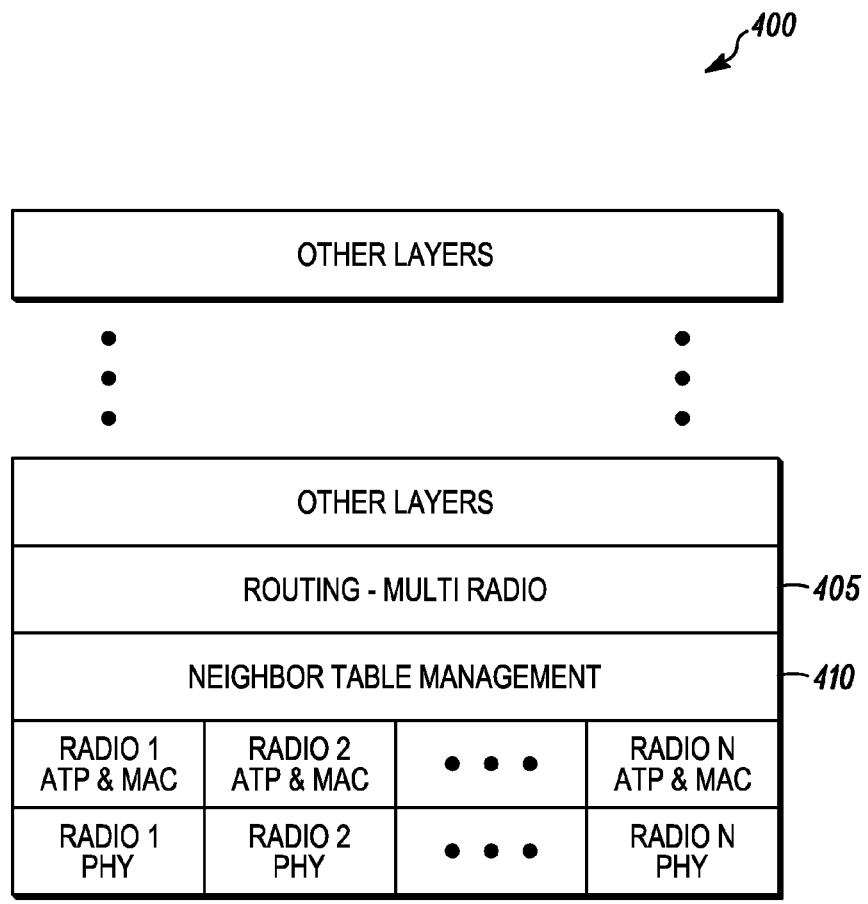
FIG. 4 is a stack diagram illustrating an example routing engine configuration using Layer 2 routing for use by a node having multiple radio interfaces, in accordance with an embodiment of the present invention.

FIG. 4 illustrates a stack 400 for use within the present invention. The architecture of the stack depicted in FIG. 4 can, for example, be used to serve the configuration. For example, the stack 400 employs one instance of routing 405 running on a fast host, in conjunction with a single instance of neighbor table management 410, as illustrated in FIG. 4. Each node employing the stack 400 includes a unique node identification (not shown) assigned within the network 300 for uniquely identifying the node. The unique node identification, for example, can be a unique 32 bit number, a unique IEEE 802 MAC address, or an equivalent. The higher layers marked as "other layers" in FIG. 4 are application or management layers residing above the single routing layer and are unaware of the presence of multiple radios in the same device. The layers marked adaptive transmission rate and power (ATP) control and MAC are dedicated, one per radio. These layers attempt to maintain optimum link connectivity using their respective PHY layers. All the PHY layers can belong to different radio technologies such as IEEE 802.11 a/b/g, IEEE 802.15.3, and the like.

Figure 5:
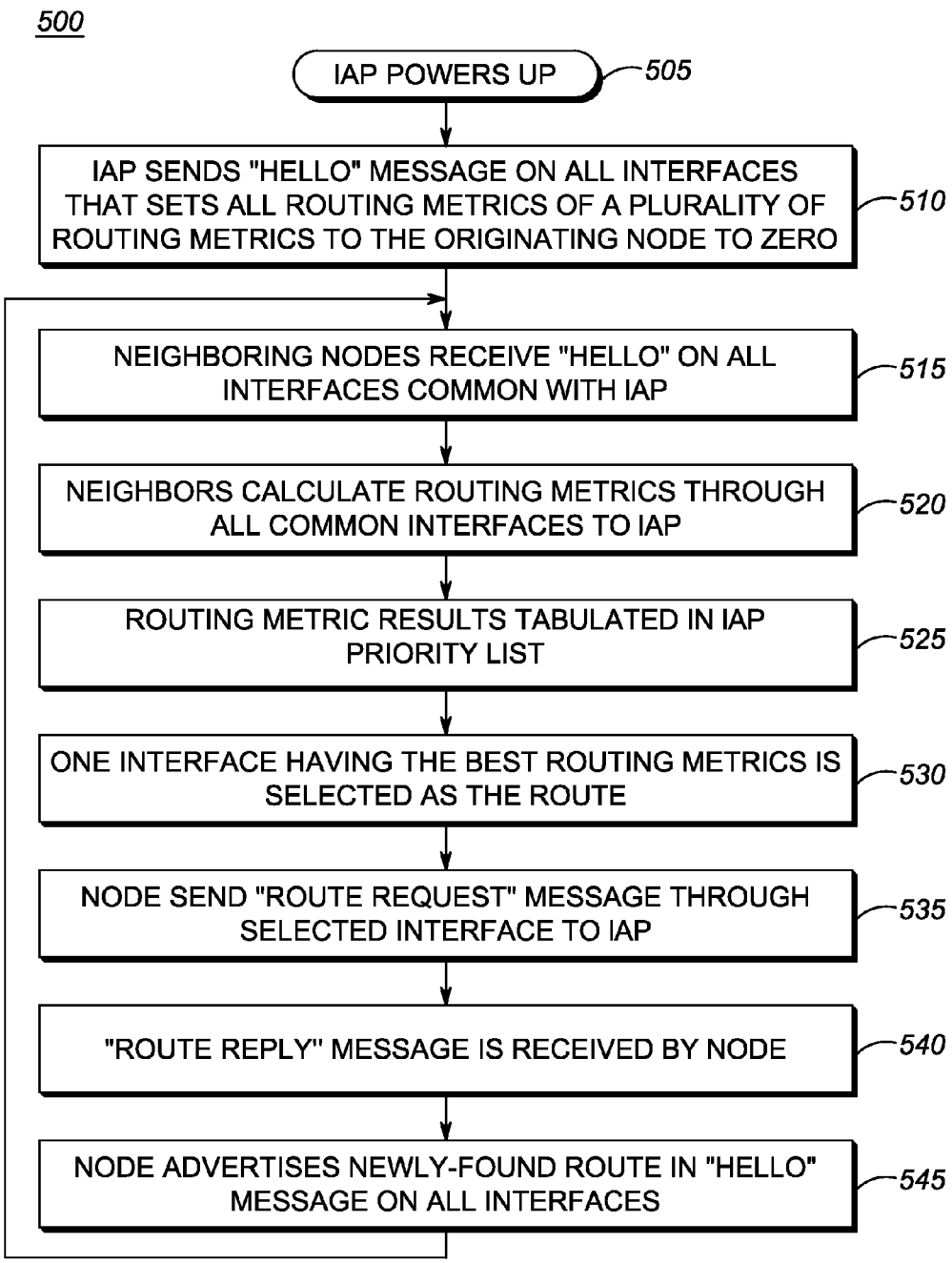
FIG. 5 is a flowchart showing an example of operations performed by a node in the network shown in FIGS. 1 and 3 to utilize multiple radio interfaces, in accordance with an embodiment of the present invention.

FIG. 5 is a flowchart illustrating an example of a method of operation 500 for use by the at least one node in utilizing multiple radio interfaces in the context of the present invention. As illustrated in FIG. 5, the operation begins with an IAP powering up in Step 505. Next, in Step 510, the IAP sends a "hello" message on one or more of its radio interfaces. The IAP, in this regard, can advertise the routing metrics as zero. Next, at least one node neighboring the IAP receives the "hello" message on all or substantially all of its interfaces which are common with that of the IAP in Step 515. Next, upon receiving such a message, the at least one node then calculates the routing metrics towards the IAP through the different radio interfaces in step 520. It will be appreciated by those of ordinary skill in the art that different radio interfaces, in this regard, can have different metrics associated with them, based on, for example, queue size, congestion on the air-interface, interference, data rate, packet completion rate, or a scheme implemented by the network provider to use specific radios for specific tasks such as backhaul. Next, the results are tabulated in an IAP priority list in step 525. An example IAP priority list is illustrated in FIG. 6.

Figure 6:
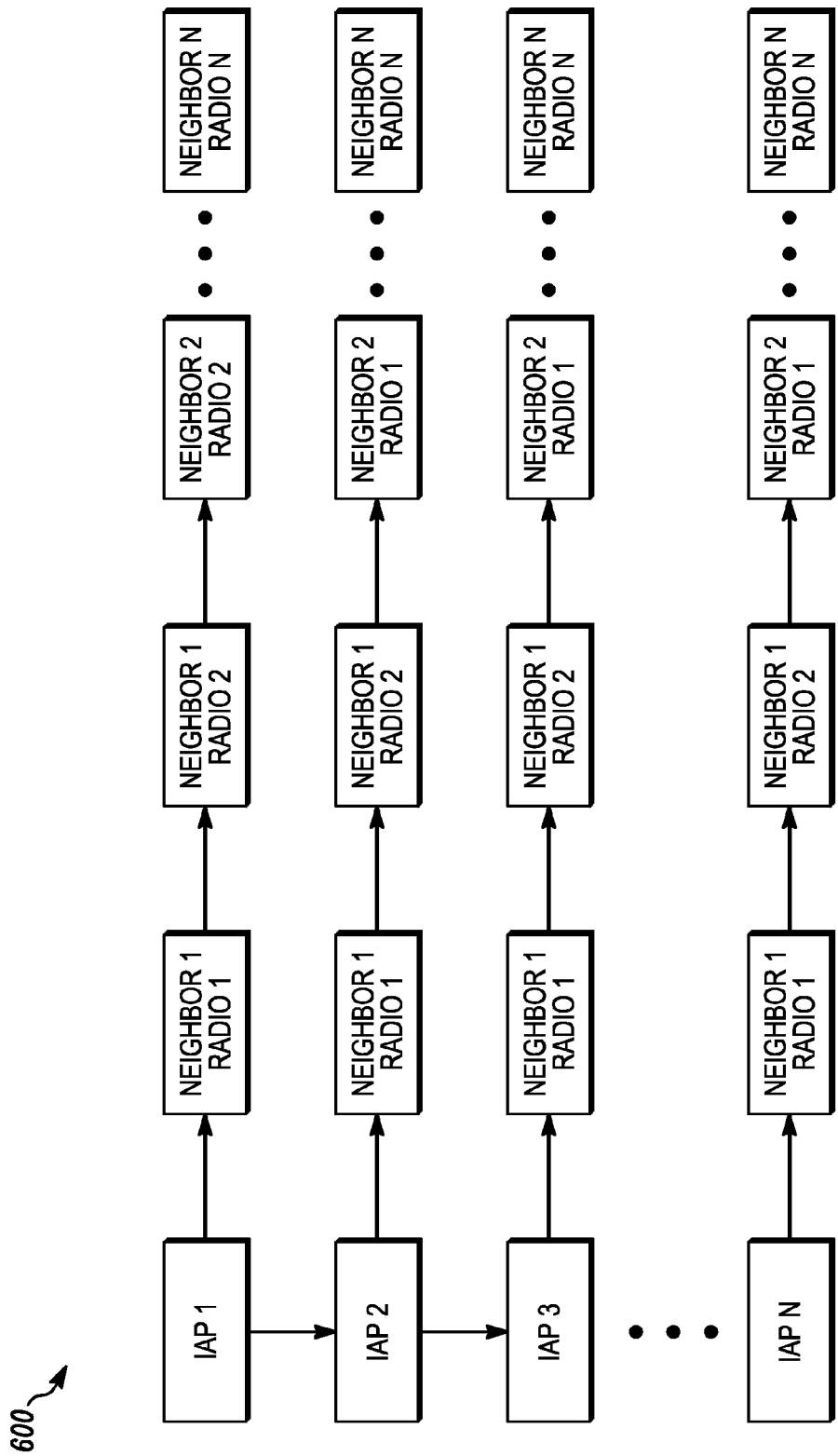
FIG. 6 is a diagram depicting a priority list of the routing metrics for different radio interfaces between a node and an intelligent access point, in accordance with an embodiment of the present invention.

FIG. 6 depicts an IAP priority list 600 of all neighboring nodes' advertising routes to an example IAP, in sorted order. A single node in the neighborhood of an IAP, in this regard, can have several entries depending upon the number of radio interfaces that the neighboring node has in common with the at least one node, including the IAP. The IAP priority list is preferably used to determine the best candidate neighboring node and the best radio interface to reach an IAP. In the network depicted in FIG. 3, for example, AP2 receives a "hello" message directly from the IAP and receives it from both Radio 1 and Radio 2. Upon receiving a "hello" message from both these radios, AP 2 then enters the information in the IAP priority list in step 525. This scheme is similar, for example, to the method described in United States Patent Application 20040143842A1 entitled "System And Method For Achieving Continuous Connectivity To An Access Point Of Gateway In A Wireless Network Following An On-Demand Routing Protocol, And To Perform Smooth Handoff Of Mobile Terminals" filed Jan. 13, 2004 and assigned to the assignee of the present invention, of which its entire contents is incorporated by reference herein.

The IAP priority list, in one embodiment, is updated as soon as any new information is received regarding the route to the IAP from any of the neighbors on any of the radio interfaces. This can be done, for example, in a way to keep it sorted in the order so that the first entry always points to the best radio interface and neighbor pair to reach the IAP. If after an update, the node finds out that the best neighbor and interface pair has changed, it takes action to establish a route to the IAP through the new best neighbor pair.

Returning to the method 500 of FIG. 5, next, depending upon the relative value of the metrics, either Radio 1 or Radio 2 is selected in Step 530 to establish the route. Next, AP2 sends a "Route Request" message towards the IAP through the selected interface, in step 535. For example, the route request can be sent in the manner described in pending United States Patent Application 20040143842A1 entitled "System And Method For Achieving Continuous Connectivity To An Access Point Of Gateway In A Wireless Network Following An On-Demand Routing Protocol, And To Perform Smooth Handoff Of Mobile Terminals" filed Jan. 13, 2004 and assigned to the assignee of the present invention, of which its entire contents is incorporated by reference herein. Next, in Step 540, a route is established and a "Route Reply" message is received by the at least one node. Next, in Step 545, at least one node sends "hello" messages on all or substantially all its interfaces advertising its newly found route. The operation then cycles back to Step 515.

It will be appreciated by those of ordinary skill in the art that the at least one node can have various possible routes towards the IAP through different neighbors and interfaces. For example, the at least one node can use the best neighbor and interface combination to establish the route to the IAP, and to advertise this best route in "hello" messages on all, or substantially all, of the interfaces. In the network illustrated in FIG. 3, for example, after AP 2 establishes a route to the IAP through one of its interfaces (e.g., Radio 1), AP 2 sends "hello" messages on all its interfaces. The "hello" message is received by AP 3 on Radio 1 and Radio 2, and AP 3 then follows a similar procedure and establishes a route to the IAP through the interface which gives AP 3 the best cumulative routing metrics to the IAP. AP 3 then broadcasts a "hello" message on all, or substantially all, of its radio interfaces.

Figure 7:
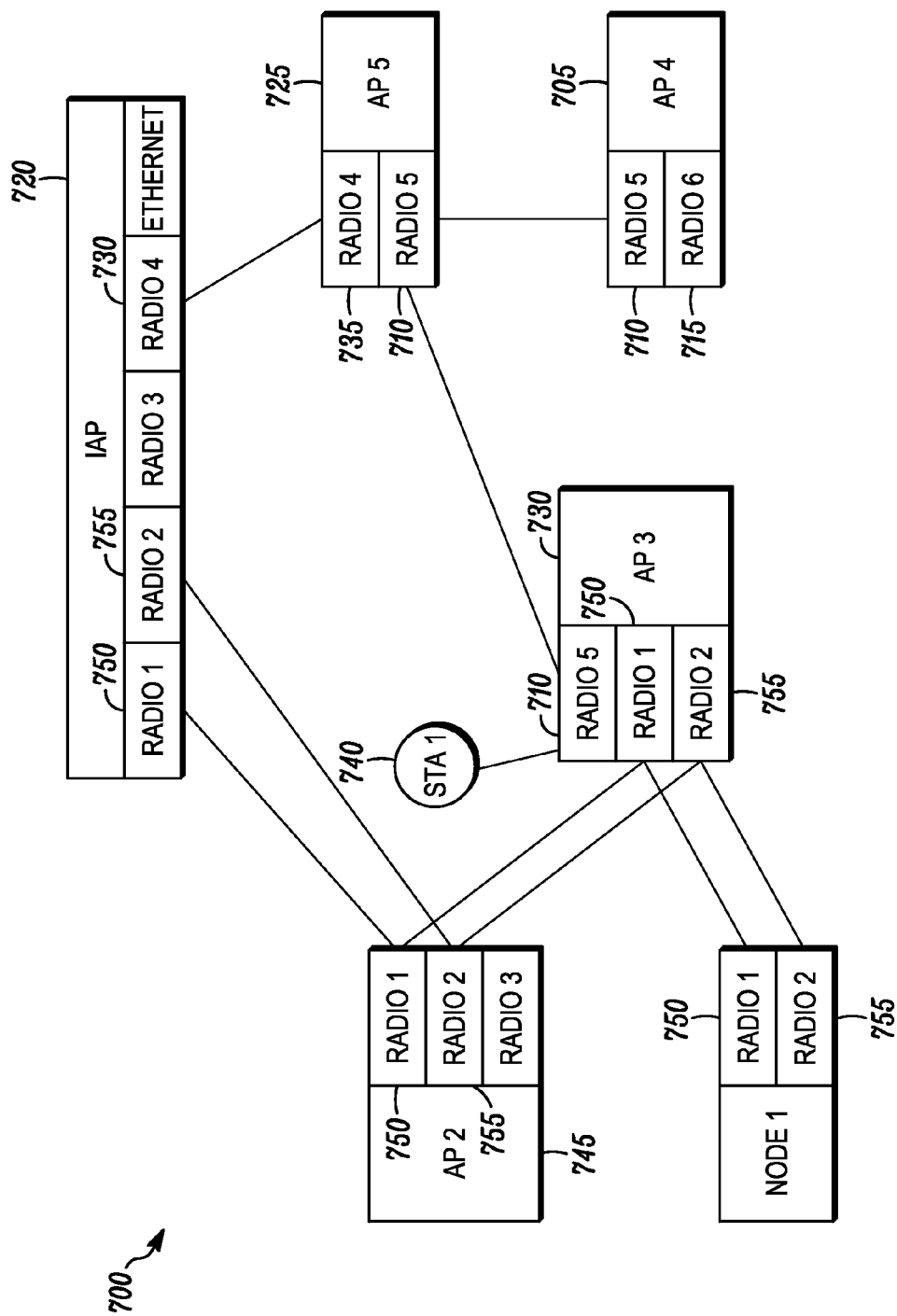
FIG. 7 is a diagram illustrating a sample network as shown in FIG. 1, in which nodes have multiple radio interfaces but not necessarily the same as their neighbors, in accordance with an embodiment of the present invention.

It will be appreciated by those of ordinary skill in the art that it is not necessary for the all the nodes in the network to have the same set of radios. The network will work if all the nodes have at least one radio which is common with its neighbor. For example, as illustrated in FIG. 7, the network 700 includes AP 4 (705) having two radios Radio 5 (710) and Radio 6 (715) which are not present in IAP 720. However, AP 4 (705) can still communicate with IAP 720 as one of its neighbors (AP 5 (725)) has two radios one of which is common with AP 3 (730) (i.e. Radio 5 (710)) and the other common with IAP 720 (i.e. Radio 4 (735).

The particular interface over which packets arrive are known to "routing protocol" when a packet is received, such as, for example, any "Route Request", "Route Reply", or "Route Error" messages. Whenever a packet is received from a new neighboring node, the interface on which that packet was received, as well as any appropriate routing information, is recorded in a route table entry for that neighboring node. Similarly, whenever a route to a new destination is learned, the interface through which the destination can be reached is recorded into the destination node's route table entry.

When the at least one node needs to broadcast or re-broadcast a "Route Request" message, it broadcasts the message on all its interfaces. Moreover, when the at least one node sends a "Route Reply" message, it can send the message through the interface which is indicated in the route entry for the corresponding node. For example, this can be the interface on which the router requirements (RREQ) with the best routing metric to the source node was received. When the at least one node needs to transmit a Route Error (RERR) message it can transmit it on those interfaces that have neighboring precursor nodes for that route.

It will be appreciated by those of ordinary skill in the art that the routing metric carried in the route reply message can account for the presence and availability of multiple similar radios and their data rates at each hop. In FIG. 7, for example, when AP3 (730) routes traffic for STA1 (740) which is associated with it, it initiates a RREQ session to determine a route to the IAP 720. The resultant RREP messages received from AP2 (745) and AP5 (725) carry route metrics that reflect the connectivity between AP2 (745) and the IAP 720 and AP5 (725) and the IAP 720. The metric received from AP2 (745) accounts for the fact that AP2 (745) has two radios in common with the IAP 720, namely Radio1 (750) and Radio2 (755). It also accounts for the data rates and the load of the two radios. The metric received from AP5 (725) accounts for the fact that AP5 (725) has only one radio in common with the IAP 720, namely Radio4 (735). It also accounts for the data rate and the load on Radio4 (735). The lower of the two metrics determines the next hop selected to reach the IAP 720.

It will be appreciated by those of ordinary skill in the art that the system and method of the present invention can also utilize one or more nodes having only one radio interface. Such nodes can follow the same procedure, as described above with respect to nodes having multiple interfaces, with the exception that the node has fewer available options. Moreover, the system and method of the present invention may comprise at least one node that utilizes the policy to connect to a network described, for example, in U.S. Pat. No. 7,251,238, filed Sep. 7, 2005 and granted on Jul. 31, 2007; and U.S. Pat. No. 7,382,759, filed Sep. 7, 2005 and granted on Jun. 3, 2008, which are both assigned to the assignee of the present application and are both incorporated herein by reference.

When forming multi-hop routes, it is possible that the nodes involved in the route have numerous dissimilar radio interfaces that can potentially be used to forward traffic to a next hop. It is generally necessary, in this regard, for at least one radio interface to be common between consecutive nodes across a link in order to ensure connectivity. However, as described above, nodes could potentially have more than one radio interface available to forward traffic to the next hop. Using multiple common radio interfaces to reach the next hop, in this regard, could provide improvement in the link capacity.

In order to efficiently utilize multiple common radio interfaces to reach a next hop, it is preferable that the packets are not received out of order at the receiver. Out of order reception is likely, for example, when the capacity and error performance of the different radios varies. If packets are received out of order, it could be very difficult and time-consuming to rearrange the packets, such that they are in the right order at the receiver. Moreover, the overhead involved in this process may offset a significant amount of throughput improvement provided by the use of multiple interfaces.

It is therefore preferable, when using multiple radio interfaces to reach a next hop in a network, for the radio interfaces to be entirely or almost entirely dedicated to forwarding one or more flows. In other words, it is preferable to ensure that a single stream of data packets be forwarded over one radio interface alone. The segregation of the streams at the transmitting end, in this regard, can be based on, for example, source address, destination address, application port number and/or any other similar higher level heuristics.

The use of destination and/or source node addresses to segregate flows on to different radio interfaces is well-suited for backbone applications. In particular, for example, most nodes forming meshed backbones, in addition to forwarding the backbone traffic, also serve local stations with the local traffic. Such nodes could use source addresses to distinguish the local traffic from the rest of the backbone network traffic that is being forwarded.

A node having multiple radio interfaces can receive a "Route Reply" message in response to its "Route Request" on one or more of its radio interfaces. In this regard, reception by multi-radio node of a "Route Reply" on a particular radio interface only conveys to the node that the next hop has a similar or common radio interface that the multi-radio node can possibly use to forward the traffic further. It does not convey the availability of more radio interfaces in the next hop, which could all be potentially used for forwarding the traffic further. As discussed earlier, the availability of more than one radio interface for forwarding makes it possible to assign different streams to different interfaces, thereby improving the throughput performance of all the streams. The availability of multiple radio interfaces, in this regard, could prove to be critical in the process of forming routes. For example, a source node might prefer a next hop node which spare the largest number of its radio interfaces to forward traffic, so that the source node is assured the best throughout, even if the same next hop is serving other traffic flows. Accordingly, it is preferable for information pertaining to the presence of multiple radios and the availability of the bandwidth over each of those radio interfaces to be conveyed, for example, by including them in the calculation of Routing Metrics and disseminating this information in "hello" or Routing messages.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method of operation of a wireless communication network comprising:
    communicatively coupling each radio of a first plurality of radios within an origination node to an associated radio of a plurality of radios within each of a plurality of neighbor nodes, thereby creating one or more communicatively coupled pair of radios;
    sending a message from each radio of the first plurality of radios of the origination node to each of the associated radios of the plurality of radios of each of the plurality of neighbor nodes, wherein the sent message comprises an advertisement that sets all routing metrics of a plurality of routing metrics to the originating node to zero;
    in response to the message received from the origination node, calculating, at each of the plurality of neighbor nodes, the routing metrics to the origination node, wherein the routing metrics account for a quantity of communicatively coupled pairs of radios between the neighbor node and the origination node;
    receiving the calculated routing metrics for each communicatively coupled pair of radios of each of the plurality of neighbor nodes from each of the plurality of neighbor nodes by the origination node; and
    selecting, by the origination node, a neighbor node and a communicatively coupled pair of radios between the selected neighbor node and the origination node for communication with the origination node based at least in part on the calculated routing metrics.

2. The method of operation of a wireless communication network as claimed in claim 1, wherein the routing metrics are further based on one or more of a queue size, a congestion on the air-interface, an interference, a data rate, a packet completion rate, a radio load, and a scheme implemented by a network provider to use specific radios for specific tasks.

3. The method of operation of a wireless communication network as claimed in claim 1, further comprising, prior to the selecting step:
    tabulating the calculated routing metrics in a priority list, and
    wherein the selecting step comprises selecting the communication route from the priority list.

4. The method of operation of a wireless communication network as claimed in claim 3, wherein the priority list comprises a sorted list of each of the plurality of neighboring nodes along with the routing metrics for each of communicatively coupled pairs of radios between the neighboring node and the origination node.

5. The method of operation of a wireless communication network as claimed in claim 1, further comprising:
    sending a route request message from the neighboring node to the origination node through the selected communicatively coupled pairs of radios.

6. The method of operation of a wireless communication network as claimed in claim 1, wherein the origination node is an access point (AP) of the wireless communication network.

7. The method as claimed in claim 6, wherein the calculating step includes a receiving by each of the plurality of neighbor nodes a broadcast message from the AP on each of its radios that is communicatively coupled to at least one radio of the AP.

8. The method as claimed in claim 7, wherein the broadcast message received by the at least one node comprises information pertaining to the amount of bandwidth available for packet stream transmission over each of the radios communicatively coupled to at least one radio of the AP.

9. The method as claimed in claim 6, further comprising: controlling each of the plurality of neighbor nodes to tabulate the routing metrics for each communicatively coupled pair of radios in a priority list.

10. The method as claimed in claim 6, wherein each of the plurality of neighbor nodes comprises a routing engine which supports multiple radio interfaces and which utilizes layer 2 routing.

11. The method as claimed in claim 6, wherein each of the plurality of neighbor nodes selects a different communicatively coupled pair of radios for the transmission of each different packet stream.

12. The method of operation of a wireless communication network as claimed in claim 5, further comprising:
    at the neighboring node:
       receiving a route reply message from the origination node indicating that the route is established; and
       advertising the selected route in one or more hello messages through all its radios.

13. A wireless communication network comprising:
    an origination node comprising a plurality of radios;
    a plurality of neighbor nodes, wherein each neighbor node comprises another plurality of radios, wherein the plurality of radios of the origination node are communicatively coupled to an associated radio of each neighbor node, thereby creating one or more communicatively coupled pairs of radios; and
    a routing engine operating to:
       receive a message from each radio of the first plurality of radios of the origination node to each of the associated radios of the plurality of radios of each of the plurality of neighbor nodes, wherein the received message comprises an advertisement that sets all routing metrics of a plurality of routing metrics to the originating node to zero,
       calculate, in response to the received messages, the routing metrics to the origination node for each of the communicatively coupled pairs of radios to transfer data between each of the plurality of neighbor nodes and the origination node, wherein each routing metric accounts for a quantity of communicatively coupled pairs of radios between the neighbor node and the origination node; and select a communication route comprising one of the communicatively coupled pairs of radios of one of the neighbor nodes and the origination node for communication with the origination node based at least in part on the calculated routing metrics.

14. The wireless communication network as claimed in claim 13, wherein the routing metrics are selected from a group of metrics comprising a queue size, a congestion on the air-interface, an interference, a data rate, a radio load, a packet completion rate, and a scheme implemented by a network provider to use specific radios for specific tasks.

15. The wireless communication network as claimed in claim 13, wherein the origination node is an Intelligent Access Point.

16. The wireless communication network as claimed in claim 13, wherein the origination node further comprises a transmitter for transmitting a message on one or more radios to the plurality of radios of each of the plurality of nodes indicating a communication requirement.

17. The wireless communication network as claimed in claim 13, further comprising:
a memory coupled to the routing engine for storing a priority list of the calculated routing metrics.

18. The wireless communication network as claimed in claim 17, wherein the priority list comprises a sorted list of each of the plurality of neighboring nodes along with the routing metrics for each of its communicatively coupled pairs of radios to the origination node.

19. A method of communicating a communication flow along a multi-hop communication route comprising one or more next hop nodes between a source node and a destination node within a wireless communication network, the method comprising:
sending a message from each radio of a plurality of radios of a current node to each of one or more communicatively coupled pair of radios of each of a plurality of next hop nodes, wherein the sent message comprises an advertisement that sets all routing metrics of each of one or more communicatively coupled pairs of radios for transferring data between each of a plurality of next hop nodes and the current node to zero;
determining, in response to the message received from the current node, the routing metrics of each of one or more communicatively coupled pairs of radios for transferring data between each of a plurality of next hop nodes and the current node wherein the determined routing metrics account for a quantity of communicatively coupled pairs of radios with the current node;
selecting a next hop node and a communicatively coupled pair of radios between the current node and the next hop node to communicate with the current node whose determined routing metrics meet a desired criteria for transmission of the communication flow;
transmitting the communication flow through a selected communicatively coupled pairs of radios of a selected next hop node; and
repeating the determining, selecting, and transmitting steps for each current node and next hop node along the multi-hop communication route from the source node to the destination node.

20. A method of communicating a plurality of communication flows along a multi-hop communication route comprising one or more next hop nodes between a source node and a destination node within a wireless communication network, the method comprising:
segregating the plurality of communication flows along the multi-hop communication route based at least in part on an application port number, wherein the segregation of the plurality of communication flows comprises distinguishing each communication flow as local traffic from a plurality of backbone network traffic that is being forwarded; and
for each of the plurality of communication flows along the multi-hop communication route:
sending a message from each radio of a plurality of radios of a current node to each of one or more communicatively coupled pair of radios of each of a plurality of next hop nodes, wherein the sent message comprises an advertisement that sets all routing metrics of each of one or more communicatively coupled pairs of radios for transferring data between each of a plurality of next hop nodes and the current node to zero;
determining, in response to the message received from the current node, the routing metrics of each of one or more communicatively coupled pairs of radios for transferring data between each of a plurality of next hop nodes and the current node wherein the determined routing metrics account for a quantity of communicatively coupled pairs of radios with the current node;
selecting a next hop communicatively coupled pair of radios comprising one of the plurality of radios of the next hop node and one of a current node radio of the plurality of current node radios of a current node, wherein the determined routing metrics of the selected next hop communicatively coupled pair of radios meets a desired criteria for transmission of the communication flow;
dedicating each selected communicatively coupled pair of radios to forwarding the communication flow wherein the selected radio group comprises the selected next hop communicatively coupled pair of radios; and
transmitting the communication flow through the dedicated selected communicatively coupled pair of radios along the multi-hop communication route from the source node to the destination node.

* * * * *